US006272956B1

(12) United States Patent
Schuettel

(10) Patent No.: US 6,272,956 B1
(45) Date of Patent: Aug. 14, 2001

(54) DEVICE FOR HOLDING A WORKPIECE OR A BAR OF MATERIAL TO BE MACHINED

(75) Inventor: Patrick Schuettel, Roches (CH)

(73) Assignee: Tornos-Bechler SA, Moutier (CH)

( * ) Notice: Subject to any disclaimer, the term of this patent is extended or adjusted under 35 U.S.C. 154(b) by 0 days.

(21) Appl. No.: 09/443,144

(22) Filed: Nov. 19, 1999

(30) Foreign Application Priority Data

Nov. 25, 1998 (EP) .................................................. 98811167

(51) Int. Cl.$^7$ ...................................................... B23B 19/02
(52) U.S. Cl. ................................ 82/142; 82/147; 82/155; 82/165
(58) Field of Search ............................ 82/142, 155, 157, 82/162, 165, 147; 279/4.01, 4.04, 4.07

(56) References Cited

U.S. PATENT DOCUMENTS

| 2,782,044 | 2/1957 | Gabriel et al. |
| 2,886,007 | * 5/1959 | Manchester ..................... 279/4.04 X |
| 3,361,433 | * 1/1968 | Holdridge ........................... 279/4.04 |
| 3,385,607 | * 5/1968 | Hughes .............................. 82/155 X |
| 3,678,790 | * 7/1972 | Riley ..................................... 82/162 |
| 4,791,841 | * 12/1988 | Pruvot et al. .......................... 82/147 |

FOREIGN PATENT DOCUMENTS

| 44 42 395 A1 | 6/1996 | (DE) . |
| 0 213 075 A1 | 3/1987 | (EP) . |
| 2 236 590 | 2/1975 | (FR) . |
| 1401275 A1 | 7/1975 | (GB) . |

* cited by examiner

*Primary Examiner*—Henry Tsai
(74) *Attorney, Agent, or Firm*—Oliff & Berridge, PLC

(57) ABSTRACT

A modular device for holding a workpiece or a bar of a material to be machined in a gripping chuck of a rotating spindle of a machine tool. A gripping chuck is actuated by a thrust tube coaxial with the spindle. To tighten the chuck, various forces are exerted including: a spring applying a first axial force on a thrust tube and applying a first air pressure force introduced through a duct into at least one tightening-pressure chamber. The tightening-pressure chamber is defined between at least a first wall fastened axially to the thrust tube and at least a second wall fastened axially to a regulating tube. Loosening of the chuck is obtained by a second air pressure introduced through another duct into at least one loosening-pressure chamber made between and on the other faces of the first walls fastened axially to the thrust tube and the other faces of the second walls fastened axially to a regulating tube. The number of tightening-pressure chambers and the number of loosening-pressure chambers being selectable according to the available air pressures.

15 Claims, 2 Drawing Sheets

DEVICE FOR HOLDING A WORKPIECE OR A BAR OF MATERIAL TO BE MACHINED

BACKGROUND OF THE INVENTION

1. Field of the Invention

The present invention relates to a device for holding a workpiece or a bar of a material to be machined on a rotating spindle of a machine tool, especially an automatic lathe or a profiling lathe provided with a spindle equipped with such a holding device.

2. Description of the Related Art

As modern high-productivity machine tools operate at high spindle speed and with tools having a large turning-removal capacity, the problem of keeping the workpiece or the bar in the spindle, or of holding the chuck mounted in the spindle, respectively, becomes most important.

The known purely mechanical holding devices, generally actuated by a bell-shaped cam, can no longer be used on machines such as mentioned above, seeing that the holding force must be transmitted by mechanical means, for example ball bearings.

The known purely pneumatic holding devices do not offer a sufficient holding capacity unless they are very voluminous. On the other hand, disappearance of the pressure generally causes a loosening of the chuck, which may be dangerous, as much for the machine as for the user.

To avoid the loosening of the chuck in case of disappearance of the pressure, it is known to effect the holding by means of the force of the spring means and, for the loosening, to use pneumatic means. In order to attain a sufficient holding capacity, it is necessary to use very strong spring means, which necessitates corresponding pneumatic means for the loosening.

Patent EP 0 213 075 describes such a holding device with a spring for attaining the holding force and pneumatic means for attaining the loosening force. For attaining a sufficient loosening force, the device is equipped with a hydraulic force amplifier. Seeing that the diameter of the primary pneumatic piston is relatively wide, the moment of inertia of the device is rather great, which is undesirable in a machine where the spindle is often stopped and accelerated. Moreover, one of the drawbacks of this device is that bubbles of air in the hydraulic liquid may make it impossible to remove the workpiece or the bar to be machined.

SUMMARY OF THE INVENTION

A first object of the invention is to provide a holding device which overcomes the drawbacks of the known devices of the prior art, i.e., offering a great holding force, not comprising any hydraulic circuit, and being capable of keeping the workpiece to be machined held in the chuck in case of disappearance of the pressure.

A second object of the invention is to provide a holding device of minimum bulk having low inertia and permitting large-diameter bars to be accepted for machining.

A third object of the invention is to provide a holding device of which the holding force is adjustable, for example in order to be able to adapt it to the material of the workpiece or the bar to be machined.

A fourth object of the invention is to provide a holding device of which the force necessary for the loosening is less than in the devices according to the state of the art, where the whole holding force is effected only by a spring.

These different are details of execution, modifications, or other embodiments the characteristics mentioned according to the invention.

One object of an embodiment of the device according to the invention is to provide a holding device, the construction of which can be adapted to the desired holding force, as well as to the air pressure available for the machine.

Another object of the invention is to provide a machine-tool spindle equipped with a holding device as above.

Still another object is to propose a machine tool, especially an automatic lathe or a profiling lathe, equipped with at least one spindle provided with a device as above.

BRIEF DESCRIPTION OF THE DRAWINGS

The description that follows describes in detail a preferred embodiment of a spindle provided with a holding device according to the invention, intended to be read in comparison with the enclosed drawing comprising the figures in which:

FIG. 3 shows the rear portion of the same spindle of FIG. 1 on a larger scale.

DETAILED DESCRIPTION OF PREFERRED EMBODIMENTS

Figure 1:
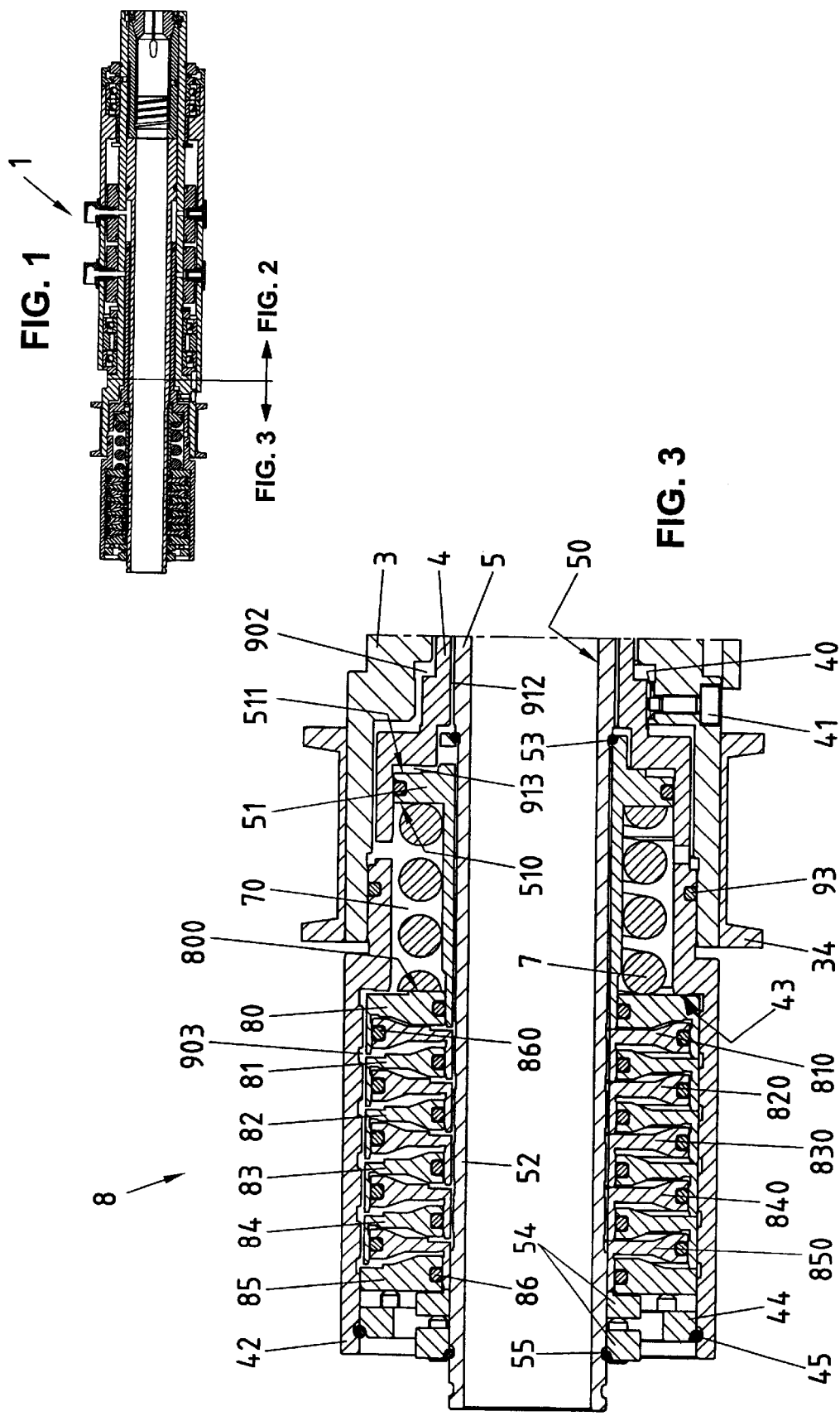
FIG. 1 shows a longitudinal section of a machine-tool spindle equipped with a holding device according to the invention, the figure showing substantially the way in which the following two figures are assembled.

The spindle 1 shown in FIG. 1 is particularly intended for a machine tool, especially a profiling lathe, suitable for machining a bar inserted from the rear in a longitudinal central channel going through the whole length of the spindle. It is of substantially cylindrical shape, its front portion being shown in section in FIG. 2, while its rear portion is more particularly visible in section in FIG. 3.

Figure 2:
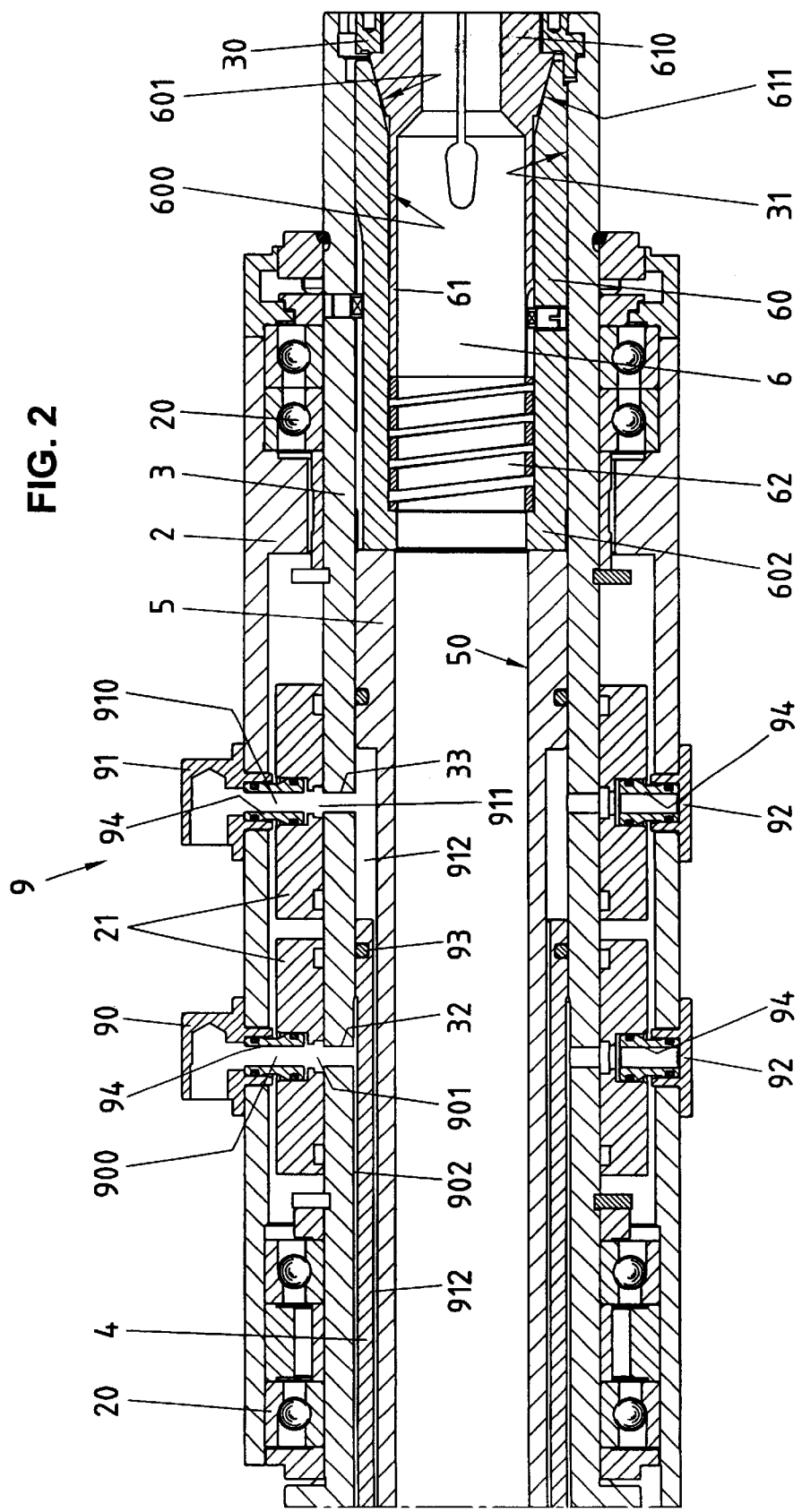
FIG. 2 shows the front portion of the spindle of FIG. 1 on a larger scale.

Referring first to FIG. 2, it is seen that the spindle 1 (FIG. 1) includes a spindle support 2, which is a fixed part forming part of, or being able to be fastened to, the body of the machine. A spindle body 3 is disposed coaxially with the spindle support 2, being supported by two sets of ball bearings 20 capable of permitting the rotation of the spindle body 3 relative to the spindle support 2 about the longitudinal axis of the spindle. The ball bearings 20, as well as the means of fastening the spindle body 3, do not permit any axial movement of said spindle body relative to the spindle support 2. The spindle body 3 includes at least two traversing radial holes 32, 33 disposed on two separate perimeters of the spindle body 3, the usefulness of these holes 32, 33 being described below; preferably, there are several radial holes 32, 33 disposed on two separate perimeters. In order to drive the spindle 1 rotatingly for machining the workpiece or the bar it carries, the spindle body 3 is provided with drive means, for example a pulley 34, capable of receiving a notched belt (see FIG. 3).

A regulating tube 4 is disposed coaxially immediately beneath the spindle body 3, being fixed to said spindle body by a thread 40 visible on FIG. 3. By screwing in the regulating tube 4 to a greater or lesser extent under the spindle body 3, there is a longitudinal adjustment of position of said regulating tube, and consequently of position of the thrust tube relative to the outside body 60, permitting an adjustment of the initial diameter of the opening of the gripping chuck 6. In order to ensure the position of the regulating tube 4 relative to the spindle body 3, a screw 41 is disposed on the circumference of the spindle body 3 in order to fix the regulating tube 4 according to a given axial regulating position. It will be seen below that a compressed air duct 902 must follow the interface between the spindle body 3 and the regulating tube 4; to this end, the thread 40 is preferably made up of several successive threaded circular segments leaving at least a passage for the air duct 902.

A thrust tube 5 is disposed coaxially immediately beneath the regulating tube 4, being capable of moving axially relative to said regulating tube. The thrust tube 5 includes a longitudinal bore 50 capable of receiving a bar to be machined at the rear and of guiding it toward the front of the spindle.

The front end of the spindle body 3, visible in FIG. 2, bears a holding ring 30 of a conventional gripping chuck 6. The gripping chuck 6 is composed of a tubular cylindrical outer body 60, capable of sliding longitudinally within an inside bore 31 of the end portion of the spindle body 3 immediately behind the ring 30, of a tubular cylindrical inner body 61 capable of sliding longitudinally within an inside bore 600 of the outer body 60. The inner body 61 bears, at its end facing toward the front of the spindle, a plurality of gripping elements 610, separated by longitudinal slits and each provided with an inclined external peripheral surface portion 611, co-operating with an internal peripheral surface 601 of the outer body 60.

Seeing that the gripping elements 610 butt against the ring 30, no axial movement of the inner body 61 is possible. It follows that a movement toward the right, relative to the figure, of the outer body 60 relative to the inner body 61 therefore causes a tightening of the gripping elements 610 about the bar or the workpiece to be machined, held between these gripping elements, whereas a movement toward the left of the outer body 60 causes a loosening. Such an arrangement without possible axial movement of the gripping elements 610 permits a machining of great precision, seeing that no axial movement is imposed upon the workpiece or on the bar to be machined at the time of the gripping or loosening of the chuck 6. The gripping chuck 6 further includes a spring element 62, for example a spiral spring, disposed between a rear face of the inner body 61 and a shoulder 602 made on the rear face of the outer body 60. Owing to the pressure exerted by the spring 62, the outer body 60 tends to be pushed back toward the rear, thus tending to loosen the chuck 6.

It is seen especially in FIG. 3 that the rear portion of the regulating tube 4 is flaring in order to leave room available for a socket 70 of a spring element 7 as well as for a pneumatic holding device 8 to be described below.

The socket 70 is bounded axially on the rear side by an annulus-shaped face 800 of a wall 80 fixed to the regulating tube 4 and on the front side by an annulus-shaped face of a shoulder 51 made on the thrust tube 5. Seeing that, after its axial position has been adjusted as indicated above, the regulating tube 4 is axially immobile, the spring 7 resting against the face 800 tends to push toward the front to the face 510 of the shoulder 51 and, consequently, the thrust tube 5 fastened to it. The front end of the thrust tube 5 coming to rest against a rear face of the outer body 60 of the gripping chuck 6, the spring 7 therefore tends to tighten the chuck 6.

Thus, in the resting state of the device, the chuck 6 is subjected, on the one hand, to the effect of the spring 62, which tends to open it or loosen it, and on the other hand, to the effect of the spring 7, which tends to close it or tighten it. The constant of the spring 7 being chosen higher than that of the spring 62, the chuck 6 closes in resting state. It is seen in FIG. 2 that the end of the thrust tube 5 just comes to rest against the rear face of the outer body 60 in order to tighten it. It follows that in case of withdrawal of the thrust tube, the spring 62 then permits the opening of the chuck 6.

The pneumatic holding device 8 is visible in FIG. 3.

At this point, it is to be mentioned that in the upper part of FIG. 3, certain drawing lines will be eliminated in order to make the passage of the compressed air more visible. The position of each specific element is, however, exactly the same in the upper and lower parts of FIG. 3. The pneumatic holding device is made up of a plurality of successive annulus shaped outside walls 80, 81, 82, 83, 84, and 85 which are held together by their outer support faces (cf. FIG. 3) between the shoulder 43 of the regulating tube 4 and the outside ring 44. The outside ring is fastened by the elastic ring 45 to the rearward end 42 of the regulating tube 4. The outside walls have notches at several locations along their edges in order to permit the passage of the compressed air (cf. upper part of FIG. 3). Similarly, another plurality of successive annulus-shaped inside walls 810, 820, 830, 840, and 850 are fastened to the rearward end 52 of the thrust tube 5. The inside walls are held together by the inner support faces (cf. lower part of FIG. 3) and are fastened to the thrust tube 5, on the one hand, with the aid of the elastic ring 53 and the part 51, and on the other hand, with the aid of a set of inside rings 54 and of the elastic ring 55. On the inside walls, too, radial and axial passages for the compressed air are found, which are visible in the upper part of FIG. 3. Each of the inside walls 810, 820, 830, 840, 850 coming in between two successive outside walls 80, 81, 82, 83, 84, 85,. The width of the free space between two successive outside walls 80, . . . 85 is greater than the thickness of an inside wall 810, . . . 850 inserted in said space, consequently each inside wall is surrounded by a first volume bounded by the preceding outside wall, and by a second volume bounded by the following outside wall. The outside walls 80, . . . 85 being fastened to the regulating tube 4, not axially movable, whereas the inside walls 810, . . . 840 are fastened to the thrust tube 5, axially movable. The relative sizes of these two volumes may vary according to the movement of the thrust tube 5. Toric joints 86, 860 are disposed on the inner edges of the outside walls 80, . . . 85, and on the outer edges of the inside walls 810, . . . 850, respectively, in order to make fluid-tight each of said first volumes relative to said second volumes.

The pneumatic holding device 8 is supplemented by a pressure-building device 9 (see FIG. 2) including especially a first intake nozzle 90 of a first tightening pressure and a second intake nozzle 91 of a second loosening pressure.

The first nozzle 90 leads the pressurized air through a pipe 900, successively traversing the spindle support 2 as well as a fluid-tightness bearing 21, the inside surface of which is in sliding contact on the outer cylindrical surface of a portion of the spindle body 3. The bearing 21 includes on its inside surface in contact with the spindle body 3 a distribution chamber 901 capable of feeding pressurized air to the hole or holes 32 disposed radially and spaced at regular intervals on a perimeter of the spindle body 3 disposed immediately opposite the distribution chamber 901. The hole or holes 32 open out on an air duct 902 made up of a space made between the inside diameter of the spindle body 3 and the outside diameter of the regulating tube 4. In FIG. 3, it is seen that this duct 902 continues toward the rear to open out in the socket 70 of the spring 7. Another duct 903 leaves the socket 70 to feed each of the holding-pressure chambers bounded by the walls 81 and 810, 82 and 820, 83 and 830, 84 and 840, 85 and 850.

In a similar manner, the second nozzle 91 leads the pressurized air through a duct 910, successively traversing the spindle support 2 as well as another fluid-tightness bearing 21 under which another distribution chamber 911 feeds pressurized air to another hole or holes 33 disposed in the same way as the hole or holes 32. The hole or holes 33 open out on a duct 912 made up essentially of a space made between the inside diameter of the regulating tube 4 and the outside diameter of the thrust tube 5. In FIG. 3, it is seen that this duct 912 continues toward the rear to open out in a first chamber 913 disposed on the front face 511, opposite the face 510 of the socket 70, of the shoulder 51, then continues still toward the rear to feed each of the loosening-pressure chambers bounded by the walls 80 and 810, 81 and 820, 82 and 830, 83 and 840, 84 and 850.

Thus, by feeding the first nozzle 90 with a first air pressure, this air pressure is therefore introduced into the socket 70, this pressure then collaborating with the spring 7 to push the face 510 of the shoulder 51 toward the front, whereas in the tightening-pressure chambers bounded by the walls 81 and 810, 82 and 820, 83 and 830, 84 and 840, 85 and 850 it tends to push toward the front the walls 810, 820, 830, 840, and 850, which, like the shoulder 51, are fastened as indicated above to the thrust tube 5. This first air pressure introduced through the nozzle therefore tends to tighten the chuck 6.

When this first pressure is nil and the second nozzle 91 is fed with a second air pressure, this pressure is therefore introduced into the chamber 913, where it opposes the bias of the spring 7, as well as into the loosening-pressure chambers bounded by the walls 80 and 810, 81 and 820, 82 and 830, 83 and 840, 84 and 850, where it is applied to the walls 810, 820, 830, 840, and 850 to push them toward the rear. Thus, the introduction of an air pressure through the nozzle 91 tends to loosen the chuck 6.

The tightening force exerted by the chuck 6, proportional to the longitudinal movement of the inner body 61, is therefore supplied by the sum of the forces exerted by; the spring 7, by the first air pressure on the face of the socket 70, by the same air pressure on the walls 810, 820, 830, 840, and 850, and being substacted from the sum of the force in the opposite direction exerted by the spring 62. In order to loosen the chuck 6, there is therefore a force made up of the sum of the forces exerted by the second air pressure being exerted in the opposite direction on the walls 511 as well as 810, 820, 830, 840, and 850 added to the force exerted by the spring 62, which sum is to be opposed to the force exerted by the spring 7. The tightening force of the chuck 6, obtained as described, may be adjusted by variation of the first air pressure, even when the spindle is rotating.

It is therefore seen that in case of disappearance of the first pressure and of the second pressure, the holding force on the chuck 6 corresponds to the force exerted by the spring 7 less the force exerted by the spring 62. This characteristic is important since, for safety reasons, it provides that in case of disappearance of the feed of pressurized air, the workpiece or the bar to be machined remains gripped in the chuck 6.

In view of the difference in the forces exerted by the springs 7 and 62, and seeing that in the example considered here, the surfaces of the walls 510 and 511, as well as the two opposite surfaces of the walls 810, 820, 830, 840, and 850 are approximately of the same values, the second air pressure used for loosening the chuck 6 must be higher than the first air pressure used for tightening the chuck 6.

It is therefore noted that the designer or user has a number of parameters available to work with in order to obtain the desired gripping force of the chuck 6, these parameters being: the constant of the spring 7, the constant of the spring 62, the first air pressure, the second air pressure, the operative surface of the walls 510 and 511, the two operative surfaces of the walls 810, . . . 850, as well as the number of pressure chambers situated on either side of said walls 810, . . . 850. The embodiment described above includes five movable walls 810, . . . 850 with five pressure chambers acting for tightening and five pressure chambers acting for loosening. In case the available air pressure is low, it is possible to add still other tightening-pressure chambers in order to increase the tightening force. As a modification, for example where it is desired to use only a single air pressure, it is also possible to design the device with a number of loosening-pressure chambers greater than the number of tightening-pressure chambers, such that the difference in the forces exerted by the pressure chambers correspond to the difference in the forces exerted by the springs. For a similar effect, and in case the force exerted by the second air pressure on the face 511 corresponds to the difference in the forces exerted by the springs, it would suffice not to feed the socket 70 with the first pressure in order to permit each of the circuits to be fed separately by the same air pressure used for tightening or for loosening.

The tiered arrangement of the tightening-pressure chambers and the loosening-pressure chambers, wherein each set of chambers is fed in parallel by the corresponding air pressure, permits a reduction in the total diameter of the spindle, hence an increase in the diameter of the passage 50 of the bar. Such a compact arrangement limits the inertia of the spindle.

At the intake nozzles 90 and 91, a slight radial force is exerted on the fluid-tightness bearings 21, caused by the pressure of the compressed air on the radial rims of the couplings 94. In order to avoid a unilateral load and, consequently, eccentricity of the bearings, at least one additional coupling 94 is provided for each intake nozzle in order for the radial forces to neutralize each other. The additional couplings are stopped with closure stoppers 92.

A plurality of toric joints 93 are disposed at the appropriate locations in order to close the ducts 902, 903, 912, 913 and to limit the loss of air pressure.

The pressurized-air feeding device has been described with two bearings 21, one for each nozzle 90 and 91. It is possible to have only a single bearing 21, provided with two pipes 900 and 910, as well as with two distribution chambers 901 and 911.

The spindle as described is actuated by pneumatic means for the tightening or loosening of the chuck 6. As a modification, it would also be possible to actuate it by the pneumatic means described for the tightening of the chuck 6 and by mechanical means, for example cam means, for its loosening. Such a modification, while preserving the advantage of keeping the workpiece or the bar to be machined gripped in the chuck in case of disappearance of the air pressure, has the additional advantage of being able to permit the intentional loosening of the workpiece or the bar in case of disappearance of the air pressure.

The above description relates to a spindle provided with a longitudinal passage 50 for a bar to be machined, intended particularly for a profiling lathe. In this case, one of the advantages of a spindle provided with a holding device according to the invention is that it is not necessary to stop the rotation of the spindle, hence of the bar, for the closing or opening actuation of the chuck 6. It is also possible to design a spindle, provided with a holding device according to the invention not including this longitudinal passage, for example for an automatic lathe. Owing to the room which then becomes available in the central part of the spindle, the latter becomes shorter. A machine tool may also include more than one spindle such as described above. A spindle as described may easily be installed on an existing machine, thus permitting the diameter of the bars which this machine can accept to be increased.

What is claimed is:

1. A device for holding a workpiece or a bar of a material to be machined in a chuck of a rotating spindle of a machine tool, the device comprising:

a first spring element that exerts a first axial force to the chuck;

a spindle body that is rotatable within a fixed spindle support;

a thrust tube disposed coaxially within the spindle body, said thrust tube being axially slidable relative to said spindle body, the axial movement of said thrust tube controlling a tightening or a loosening of the chuck;

a regulating tube disposed coaxially between a rear portion of the spindle body and a rear portion of the thrust tube, said regulating tube being fixed axially;

a first socket receiving the first spring element, the first socket is circumferentially bounded between said regulating tube and said thrust tube and axially bounded on one side by a first annulus-shaped face of a first wall fastened to the regulating tube, and on the other side by a second annulus-shaped face of a shoulder fastened to the thrust tube, said first axial force exerted by said first spring element tending to move the first and second annulus-shaped faces apart thereby moving the thrust tube along said first axial direction; and at least one tightening-pressure chamber defined between at least one second wall fastened to the regulating tube and at least one third wall fastened to the thrust tube, said tightening-pressure chamber being supplied with a first air pressure that exerts a second axial force on a face of the at least one third wall, which is a wall disposed substantially perpendicular to a longitudinal axis of said spindle, the first and second axial forces being exerted along a first axial direction parallel to the longitudinal axis of the spindle to exert a gripping force.

2. The device according to claim 1, further comprising:

at least one loosening-pressure chamber defined between the other face of the at least one second wall fastened to the regulating tube and the other face of the at least one third wall fastened to the thrust tube, said loosening-pressure chamber being fed by a second air pressure that exerts a third axial force on the other face of the at least one third wall to loosen the chuck, the third axial force exerted along a second axial direction parallel to the longitudinal axis of the spindle and opposite to the first axial direction.

3. The device according to claim 1, wherein the first socket is fed by said first air pressure, to provide an additional tightening-pressure chamber.

4. The device according to claim 2, wherein a fourth force is exerted by a second spring element along said second axial direction to loosen the chuck.

5. The device according to claim 1, wherein a second socket situated on an other face of the shoulder is fed by said second air pressure to provide an additional loosening-pressure chamber.

6. The device according to claim 1, wherein the first air pressure is introduced through a nozzle feeding a pipe traversing the spindle support, feeding through a bearing provided with a distribution chamber, feeding at least one hole radially traversing the spindle body, and opening out in a duct disposed coaxially between the spindle body and the regulating tube, said duct feeding at least one of said tightening-pressure chambers disposed between the at least one second wall fastened to the regulating tube and the at least one third wall fastened to the thrust tube.

7. The device according to claim 6, wherein said duct feeds the first socket of said first spring element.

8. The device according to claim 2, wherein the second air pressure is introduced through a nozzle feeding a pipe traversing the spindle support, feeding through a bearing provided with a distribution chamber, feeding at least one hole radially traversing the spindle body, and opening out in a duct disposed coaxially between the regulating tube and the thrust tube, said duct feeding at least one of said loosening-pressure chambers disposed between the at least one second wall fastened to the regulating tube and the at least one third wall fastened to the thrust tube.

9. The device according to claim 8, wherein said duct feeds a second socket situated on an other face of the shoulder.

10. The device according to claim 4, wherein the first axial force exerted by said first spring element is greater than said fourth force exerted by said second spring element.

11. The device according to claim 6, wherein there are a plurality of said second walls, a plurality of said third walls, and a plurality of said tightening-pressure chamber, and the number of said tightening-pressure chambers and the number of said loosening-pressure chambers are variable in response to available air pressure in order to attain sufficient tightening and loosening forces.

12. The device according to claim 6, wherein the duct of the first air pressure and the duct of the second air pressure are each provided with at least two couplings distributed symmetrically about a bearing to equalize the radial forces by the first and second air pressures on the bearing.

13. A spindle of a machine tool having a gripping chuck that includes the device according to claim 1.

14. The spindle according to claim 13, wherein the spindle includes a longitudinal bore that provides passage to a bar to be machined.

15. A machine tool including at least one spindle including a holding device according to claim 1.

* * * * *